(12) United States Patent
Naserian et al.

(10) Patent No.: US 10,150,463 B2
(45) Date of Patent: Dec. 11, 2018

(54) SYSTEM AND METHOD FOR MANAGING OPERATIONAL STATES OF A VEHICLE PROPULSION SYSTEM

(71) Applicant: GM Global Technology Operations LLC, Detroit, MI (US)

(72) Inventors: Mohammad Naserian, Windsor (CA); Samantha Victoria Lado, Highland, MI (US); Allan K. Lewis, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 22 days.

(21) Appl. No.: 15/453,086

(22) Filed: Mar. 8, 2017

(65) Prior Publication Data

US 2018/0257632 A1 Sep. 13, 2018

(51) Int. Cl.
| | |
|---|---|
| *B60W 20/12* | (2016.01) |
| *B60W 10/06* | (2006.01) |
| *B60W 10/08* | (2006.01) |
| *B60W 10/26* | (2006.01) |
| *B60W 30/18* | (2012.01) |
| *B60K 6/48* | (2007.10) |

(52) U.S. Cl.
CPC ............ *B60W 20/12* (2016.01); *B60W 10/06* (2013.01); *B60W 10/08* (2013.01); *B60W 10/26* (2013.01); *B60W 30/18009* (2013.01); *B60K 6/48* (2013.01); *B60W 2520/10* (2013.01); *B60W 2550/142* (2013.01); *B60W 2550/408* (2013.01); *B60W 2710/06* (2013.01); *B60W 2710/08* (2013.01); *B60W 2710/244* (2013.01); *B60Y 2200/92* (2013.01); *Y10S 903/93* (2013.01)

(58) Field of Classification Search
CPC ...... B60W 20/12; B60W 10/06; B60W 10/08; B60W 10/26; B60W 20/104; B60W 30/18009; B60W 2520/10; B60K 6/48; B60K 6/445; Y10S 903/93
USPC ................................................. 701/22, 36
See application file for complete search history.

(56) References Cited

U.S. PATENT DOCUMENTS

2015/0046000 A1* 2/2015 Zhao .................. B60K 6/445
 701/22
2017/0120762 A1* 5/2017 Zettel .................. B60L 7/14

* cited by examiner

*Primary Examiner* — Gertrude Arthur Jeanglaude

(57) ABSTRACT

A system according to the principles of the present disclosure includes a power determination module and a powertrain control module that includes a state selection module. The power determination module can estimate power required to travel at a desired speed on a roadway segment located in an anticipated path of a vehicle based upon an estimated slope of the roadway segment. The powertrain control module can control operational states of a hybrid powertrain. The powertrain control module includes a state selection module that can determine whether a current operational state is capable of producing the estimated power based upon a state of charge of a vehicle battery. The state selection module can also switch to another operational state that is capable of producing the estimated power if the current operational state is incapable of producing the estimated power.

20 Claims, 9 Drawing Sheets

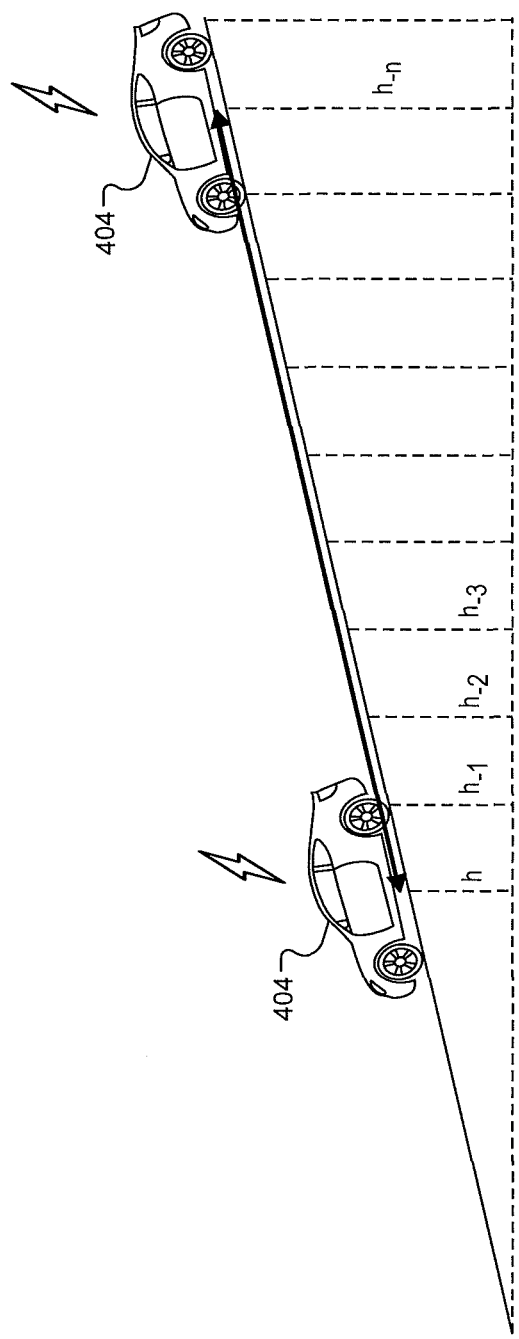

ism and a method for biasing selection between multiple operational states based upon a road geometry (i.e., slope or grade) of a roadway segment being traversed by the vehicle.

SYSTEM AND METHOD FOR MANAGING OPERATIONAL STATES OF A VEHICLE PROPULSION SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle propulsion systems employing multiple operational states, and more specifically to a system and a method for biasing selection between multiple operational states based upon a road geometry (i.e., slope or grade) of a roadway segment being traversed by the vehicle.

Powertrain systems transfer torque originating from multiple torque-generative devices through a torque transmission device to an output member coupled to a driveline. Control systems for operating such powertrain systems operate the torque-generative devices and apply torque transfer components in the transmission to transfer torque in response to operator-commanded output torque requests. Torque-generative devices can include internal combustion engines and non-combustion electric devices. Non-combustion electric devices include electric devices that are operative as motors or generators to generate a torque input to the transmission independently of a torque input from the internal combustion engine. The electric devices transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices and regulating the electrical power interchange among the electrical energy storage device and the electric machines to manage outputs of the transmission, including torque and rotational speed.

SUMMARY

A system according to the principles of the present disclosure includes a power determination module and a powertrain control module that includes a state selection module. The power determination module can estimate power required to travel at a desired speed on a roadway segment located in an anticipated path of a vehicle based upon an estimated slope of the roadway segment. The powertrain control module can control operational states of a hybrid powertrain. The powertrain control module includes a state selection module that can determine whether a current operational state is capable of producing the estimated power based upon a state of charge of a vehicle battery. The state selection module can also switch to another operational state that is capable of producing the estimated power if the current operational state is incapable of producing the estimated power.

A method according to the principles of the present disclosure includes estimating power required to travel at a desired speed on a roadway segment located in an anticipated path of a vehicle based upon an estimated slope of the roadway segment. The method also includes determining whether a current operational state is capable of producing the estimated power based upon a state of charge of a vehicle battery and switching to another one of the plurality of operational states that is capable of producing the estimated power if the current operational state is incapable of producing the estimated power.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a diagrammatic illustration of an example host vehicle receiving elevation data from a global navigation satellite system according to the principles of the present disclosure;

In the drawings, reference numbers may be reused to identify similar and identical elements.

DETAILED DESCRIPTION

A hybrid propulsion system, or powertrain, may include an electric motor, an engine, and a transmission. The hybrid propulsion system can operation in one of a plurality of propulsion system (i.e., operational) states. In one example, the operational states include multiple transmission ranges and engine states to generate and transfer torque to a driveline of the hybrid propulsion system.

The engine and the transmission can be connected via a torque converter. The torque converter may include multiple clutches. When a clutch is selectively engaged, the hybrid propulsion system operates in a first operational state where torque generated by the engine is transferred to the transmission. When the clutch is selectively disengaged, the hybrid propulsion system operates in a second operational state where torque generated by the engine may not get transferred to the transmission.

The engine system (i.e., hybrid propulsion system) of the present disclosure can estimate one or more roadway geometry characteristics of a roadway segment located in an anticipated path of a vehicle (i.e., a host vehicle) and determine a capable operational state for the vehicle based upon the estimated roadway geometry characteristics (i.e., slope or grade). In one example, depending upon the estimated roadway geometry characteristics, a powertrain control module of the engine system determines whether to bias the engine system to a charge sustaining operational state or a charge depleting operational state. Based upon the biasing, the powertrain control module can cause the transmission control module of the engine system to selectively shift gears within the transmission causing the engine system to transition from the first operational state to the second operational state.

Figure 1:
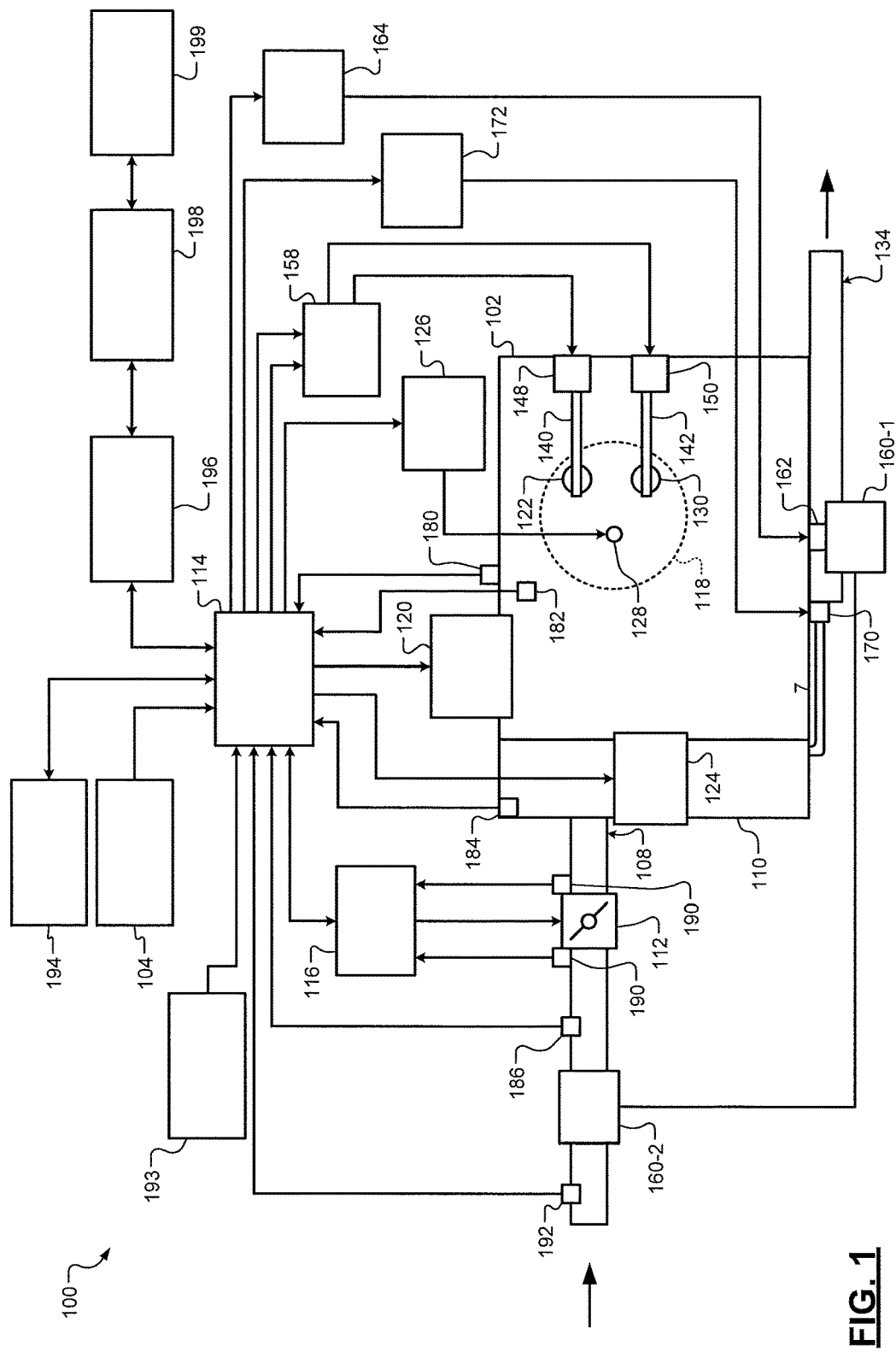
FIG. 1 is a functional block diagram of an example engine system according to the principles of the present disclosure.

Referring now to FIG. 1, a functional block diagram of an exemplary engine system 100 (i.e., powertrain system) is presented. The engine system 100 includes an engine 102 that combusts an air/fuel mixture to produce drive torque for a vehicle based on driver input from a driver input module 104. Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and may control the intake valves (including the intake valve 122) of multiple banks of cylinders (including the cylinder 118). Similarly, multiple exhaust camshafts (including the exhaust camshaft 142) may control multiple exhaust valves for the cylinder 118 and may control exhaust valves (including the exhaust valve 130) for multiple banks of cylinders (including the cylinder 118).

The cylinder actuator module 120 may deactivate the cylinder 118 by disabling opening of the intake valve 122 and the exhaust valve 130. In various other implementations, the intake valve 122 and the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and for storage in a battery. In various implementations, various functions of the ECM 114, the transmission control module 194, and the hybrid control module 196 may be integrated into one or more modules.

As shown, the electric motor 198 can be powered by a battery 199 that stores potential electric energy. It is appreciated that the battery 199 is an electric energy storage device that can include a plurality of electrical cells, ultra-capacitors, and other devices configured to store electric energy on-vehicle. In one example, the battery 199 includes a plurality of lithium-ion cells. Parametric states associated with the battery 199 include a state-of-charge (SOC), temperature, available voltage, and available battery power, each of which is monitored by the ECM 114.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

The engine system 100 also includes sensors 193. The sensors 193 are configured in a variety of ways. In one example, the sensors 193 receive signals transmitted and received within a vehicle-to-vehicle communication system (i.e., global navigation satellite system (GNSS) receivers, dedicated short range communications (DSRC) radios, etc.). In some examples, the sensors 193 are objection detection sensors for detecting objects proximate to a vehicle. The sensors 193 may also be receivers for receiving signals encoded with elevation and time data transmitted and received according to advanced driver assistance systems (ADASIS) communication protocols. The sensors 193 may also measure various vehicle operational parameters associated with the vehicle. For instance, the sensors 193 may measure speed, acceleration, distance traveled, and the like.

Figure 2:
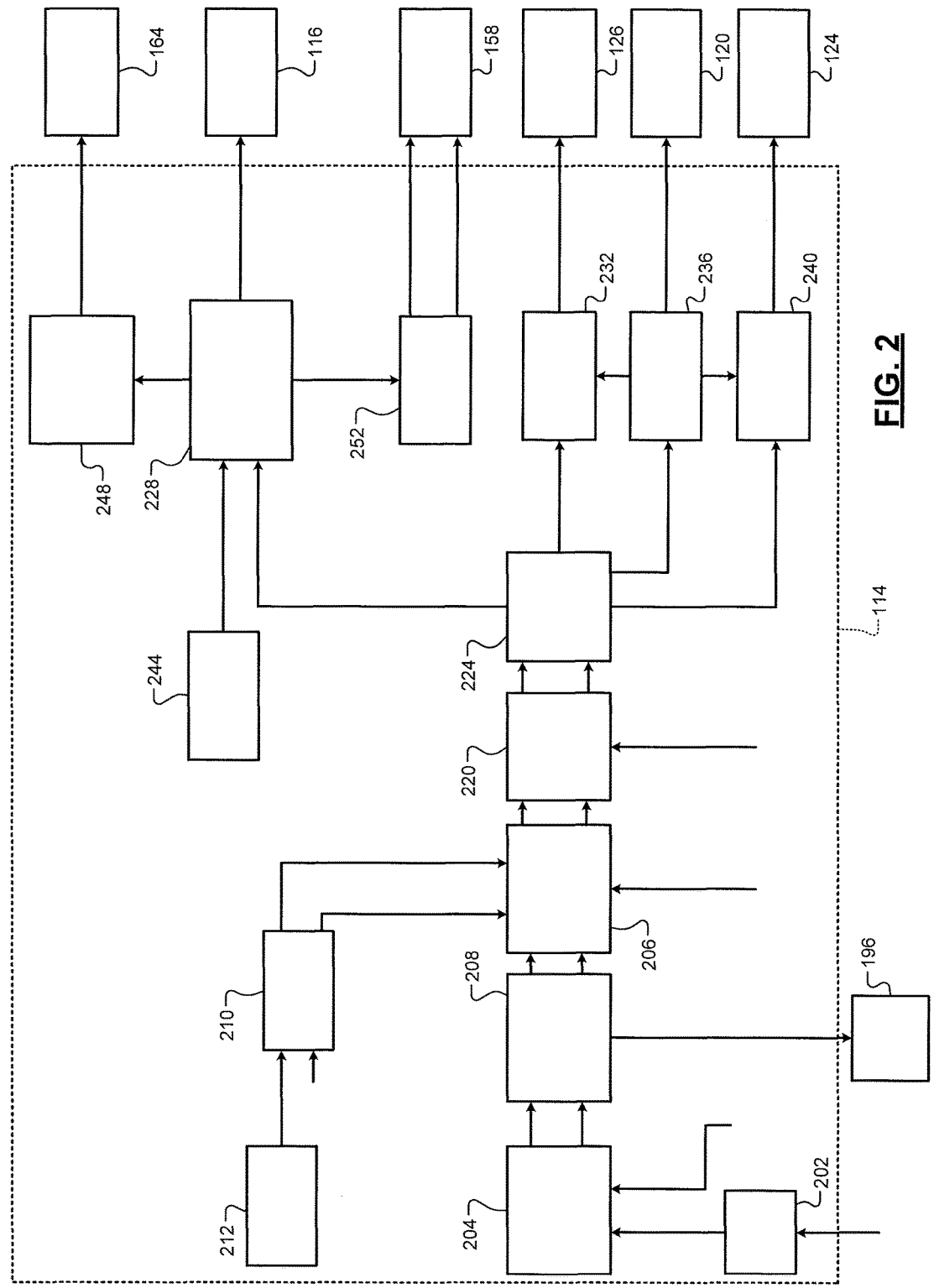
FIG. 2 is a functional block diagram of an example engine control module according to the principles of the present disclosure.

Referring now to FIG. 2, a functional block diagram of an exemplary engine control system is presented. An exemplary implementation of the ECM 114 includes a driver torque module 202. The driver torque module 202 may determine a driver torque request based on a driver input from the driver input module 104. The driver input may be based on a position of an accelerator pedal. The driver input may also be based on cruise control, which may be an adaptive cruise control system that varies vehicle speed to maintain a predetermined following distance. The driver torque module 202 may store one or more mappings of accelerator pedal position to desired torque, and may determine the driver torque request based on a selected one of the mappings.

An axle torque arbitration module 204 arbitrates between the driver torque request from the driver torque module 202 and other axle torque requests. Axle torque (torque at the wheels) may be produced by various sources including an engine and an electric motor. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

Axle torque requests may include a torque reduction requested by a traction control system when positive wheel slip is detected. Positive wheel slip occurs when axle torque overcomes friction between the wheels and the road surface, and the wheels begin to slip against the road surface. Axle torque requests may also include a torque increase request to counteract negative wheel slip, where a tire of the vehicle slips with respect to the road surface because the axle torque is negative.

Axle torque requests may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 204 may selectively be adjusted by other modules of the ECM 114 before being used to control actuators of the engine system 100.

In general terms, the immediate torque request is the amount of currently desired axle torque, while the predicted torque request is the amount of axle torque that may be needed on short notice. The ECM 114 therefore controls the engine system 100 to produce an axle torque equal to the immediate torque request. However, different combinations of actuator values may result in the same axle torque. The ECM 114 may therefore adjust the actuator values to allow a faster transition to the predicted torque request, while still maintaining the axle torque at the immediate torque request.

In various implementations, the predicted torque request may be based on the driver torque request. The immediate torque request may be less than the predicted torque request, such as when the driver torque request is causing wheel slip on an icy surface. In such a case, a traction control system (not shown) may request a reduction via the immediate torque request, and the ECM 114 reduces the torque produced by the engine system 100 to the immediate torque request. However, the ECM 114 controls the engine system 100 so that the engine system 100 can quickly resume producing the predicted torque request once the wheel slip stops.

In general terms, the difference between the immediate torque request and the higher predicted torque request can be referred to as a torque reserve. The torque reserve may represent the amount of additional torque that the engine system 100 can begin to produce with minimal delay. Fast engine actuators are used to increase or decrease current axle torque. As described in more detail below, fast engine actuators are defined in contrast with slow engine actuators.

In various implementations, fast engine actuators are capable of varying axle torque within a range, where the range is established by the slow engine actuators. In such implementations, the upper limit of the range is the predicted torque request, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request is within the range, fast engine actuators can be set to cause the axle torque to be equal to the immediate torque request. When the ECM 114 requests the predicted torque request to be output, the fast engine actuators can be controlled to vary the axle torque to the top of the range, which is the predicted torque request.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request if the fast actuators were set to appropriate values. Meanwhile, the ECM 114 may set actuator values for fast actuators to values that, given the slow actuator values, cause the engine system 100 to produce the immediate torque request instead of the predicted torque request.

The fast actuator values therefore cause the engine system 100 to produce the immediate torque request. When the ECM 114 decides to transition the axle torque from the immediate torque request to the predicted torque request, the ECM 114 changes the actuator values for one or more fast actuators to values that correspond to the predicted torque request. Because the slow actuator values have already been set based on the predicted torque request, the engine system 100 is able to produce the predicted torque request after only the delay imposed by the fast actuators. In other words, the longer delay that would otherwise result from changing axle torque using slow actuators is avoided.

For example only, when the predicted torque request is equal to the driver torque request, a torque reserve may be created when the immediate torque request is less than the driver torque request due to a temporary torque reduction request. Alternatively, a torque reserve may be created by increasing the predicted torque request above the driver torque request while maintaining the immediate torque request at the driver torque request. The resulting torque reserve can absorb sudden increases in required axle torque. For example only, sudden loads from an air conditioner or a power steering pump may be counterbalanced by increasing the immediate torque request. If the increase in immediate torque request is less than the torque reserve, the increase can be quickly produced by using fast actuators. The predicted torque request may then also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and wear more quickly when moved frequently. Creating a sufficient torque reserve allows changes in desired torque to be made by varying fast actuators via the immediate torque request while maintaining the values of the slow actuators. For example, to maintain a given idle speed, the immediate torque request may vary within a range. If the predicted torque request is set to a level above this range, variations in the immediate torque request that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening area may be used as an actuator value for engine characteristics other than torque. Compression-ignition engines may combust fuels including, for example, diesel, by compressing the fuels.

When the engine 102 is a spark-ignition engine, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to a calibrated value, maximum torque is produced in the combustion stroke immediately following the firing event. However, a spark advance deviating from the calibrated value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the calibrated value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle valve opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough air flow for the engine 102 to produce the predicted torque request, the spark timing is retarded (which reduces torque) based on the immediate torque request. The engine output torque will therefore be equal to the immediate torque request.

When additional torque is needed, such as when the air conditioning compressor is started, or when traction control determines wheel slip has ended, the spark timing can be set based on the predicted torque request. By the following firing event, the spark actuator module 126 may return the spark advance to a calibrated value, which allows the engine 102 to produce the full engine output torque achievable with the air flow already present. The engine output torque may therefore be quickly increased to the predicted torque request without experiencing delays from changing the throttle opening area.

When the engine 102 is a compression-ignition engine, the fuel actuator module 124 may be a fast actuator and the throttle actuator module 116 and the boost actuator module 164 may be emissions actuators. In this manner, the fuel mass may be set based on the immediate torque request, and the throttle opening area and boost may be set based on the predicted torque request. The throttle opening area may generate more air flow than necessary to satisfy the predicted torque request. In turn, the air flow generated may be more than required for complete combustion of the injected fuel such that the air/fuel ratio is usually lean and changes in air flow do not affect the engine torque output. The engine output torque will therefore be equal to the immediate torque request and may be increased or decreased by adjusting the fuel flow.

The throttle actuator module 116, the boost actuator module 164, and the EGR actuator module 172 may be controlled based on the predicted torque request to control emissions and to minimize turbo lag. The throttle actuator module 116 may create a vacuum to draw exhaust gases through the EGR valve 170 and into the intake manifold 110.

The axle torque arbitration module 204 may output the predicted torque request and the immediate torque request to a propulsion torque arbitration module 206. In various implementations, the axle torque arbitration module 204 may output the predicted and immediate torque requests to a powertrain control module 208. The powertrain control module 208 determines how much torque should be produced by the engine 102 and how much torque should be produced by the electric motor 198. The powertrain control module 208 then outputs modified predicted and immediate torque requests to the propulsion torque arbitration module 206. In various implementations, the powertrain control module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the powertrain control module 208.

The propulsion torque arbitration module 206 arbitrates between propulsion torque requests, including the converted predicted and immediate torque requests. The propulsion torque arbitration module 206 generates an arbitrated predicted torque request and an arbitrated immediate torque request. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which reduces the engine output torque when the driver depresses the clutch pedal in a manual transmission vehicle to prevent a flare (rapid rise) in engine speed.

Propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque request from the axle torque arbitration module 204 is less than a predetermined torque value.

The RPM control module 210 receives a desired RPM from an RPM trajectory module 212, and controls the predicted and immediate torque requests to reduce the difference between the desired RPM and the current RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. The reserves/loads module 220 may adjust the arbitrated predicted and immediate torque requests to create a torque reserve and to compensate for one or more loads. The reserves/loads module 220 then outputs the adjusted predicted and immediate torque requests to an actuation module 224.

For example only, a catalyst light-off process or a cold start emissions reduction process may require retarded spark advance. The reserves/loads module 220 may therefore increase the adjusted predicted torque request above the adjusted immediate torque request to create retarded spark for the cold start emissions reduction process. In another example, the air/fuel ratio of the engine and the mass air flow may be directly varied, such as by diagnostic intrusive equivalence ratio testing and new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the NC compressor clutch may be created when the driver first requests air conditioning. The reserves/loads module 220 may increase the adjusted predicted torque request while leaving the adjusted immediate torque request unchanged to produce the torque reserve. Then, when the A/C compressor clutch engages, the reserves/loads module 220 may increase the immediate torque request by the estimated load of the A/C compressor clutch.

The actuation module 224 receives the adjusted predicted and immediate torque requests from the reserves/loads module 220. The actuation module 224 determines how the adjusted predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request based on the adjusted predicted torque request. The air torque request may be equal to the adjusted predicted torque request, setting air flow so that the adjusted predicted torque request can be achieved by changes to other actuators.

An air control module 228 may determine desired actuator values based on the air torque request. For example, the air control module 228 may control desired manifold absolute pressure (MAP), desired throttle area, and desired air per cylinder (APC). Desired MAP may be used to determine desired boost, and desired APC may be used to determine desired cam phaser positions. In various implementations, the air control module 228 may also determine an amount of opening of the EGR valve 170.

The actuation module 224 may also generate a spark torque request, a cylinder shut-off torque request, and a fuel torque request. The spark torque request may be used by a spark control module 232 to determine how much to retard the spark timing (which reduces engine output torque) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel torque request from the actuation module 224. During normal operation of a spark-ignition engine, the fuel control module 240 may operate in an air lead mode in which the fuel control module 240 attempts to maintain a stoichiometric air/fuel ratio by controlling fuel flow based on air flow. The fuel control module 240 may determine a fuel mass that will yield stoichiometric combustion when combined with the current amount of air per cylinder. The fuel control module 240 may instruct the fuel actuator module 124 via the fueling rate to inject this fuel mass for each activated cylinder.

In compression-ignition systems, the fuel control module 240 may operate in a fuel lead mode in which the fuel control module 240 determines a fuel mass for each cylinder that satisfies the fuel torque request while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

A mode setting may determine how the actuation module 224 treats the adjusted immediate torque request. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the adjusted immediate torque request and set engine output torque based on the adjusted predicted torque request. The actuation module 224 may therefore set the spark torque request, the cylinder shut-off torque request, and the fuel torque request to the adjusted predicted torque request, which maximizes engine output torque for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 outputs the adjusted predicted torque request as the air torque request and attempts to achieve the adjusted immediate torque request by adjusting only spark advance. The actuation module 224 therefore outputs the adjusted immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved. The engine output torque will then be greater than the adjusted immediate torque request.

In the maximum range mode, the actuation module 224 may output the adjusted predicted torque request as the air torque request and the adjusted immediate torque request as the spark torque request. In addition, the actuation module 224 may decrease the cylinder shut-off torque request (thereby deactivating cylinders) when reducing spark advance alone is unable to achieve the adjusted immediate torque request.

In the auto actuation mode, the actuation module 224 may decrease the air torque request based on the adjusted immediate torque request. In various implementations, the air torque request may be reduced only so far as is necessary to allow the spark control module 232 to achieve the adjusted immediate torque request by adjusting spark advance. Therefore, in auto actuation mode, the adjusted immediate torque request is achieved while adjusting the air torque request as little as possible. In other words, the use of relatively slowly-responding throttle valve opening is minimized by reducing the quickly-responding spark advance as much as possible. This allows the engine 102 to return to producing the adjusted predicted torque request as quickly as possible.

A torque estimation module 244 may estimate torque output of the engine 102. This estimated torque may be used by the air control module 228 to perform closed-loop control of engine air flow parameters, such as throttle area, MAP, and phaser positions. For example, a torque relationship such as $$T=f(APC,S,I,E,AF,OT,\#) \qquad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve.

This relationship may be modeled by an equation and may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions.

The actual spark advance may be used to estimate the actual engine output torque. When a calibrated spark advance value is used to estimate torque, the estimated torque may be called an estimated air torque, or simply air torque. The air torque is an estimate of how much torque the engine could generate at the current air flow if spark retard was removed (i.e., spark timing was set to the calibrated spark advance value) and all cylinders were fueled.

The air control module 228 may output a desired area signal to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and the MAF signal in order to perform closed loop control. For example, the desired area signal may be controlled to minimize a difference between the estimated air torque and the air torque request.

The air control module 228 may output a desired manifold absolute pressure (MAP) signal to a boost scheduling module 248. The boost scheduling module 248 uses the desired MAP signal to control the boost actuator module 164. The boost actuator module 164 then controls one or more turbochargers (e.g., the turbocharger including the turbine 160-1 and the compressor 160-2) and superchargers.

The air control module 228 may also output a desired air per cylinder (APC) signal to a phaser scheduling module 252. Based on the desired APC signal and the RPM signal, the phaser scheduling module 252 may control positions of the intake and exhaust cam phasers 148 and 150 using the phaser actuator module 158.

Referring back to the spark control module 232, calibrated spark advance values may vary based on various engine operating conditions. For example only, a torque relationship may be inverted to solve for desired spark advance. For a given torque request (Tdes), the desired spark advance (Sdes) may be determined based on $$S_{des}=f^{-1}(T_{des},APC,I,E,AF,OT,\#). \quad (2)$$

This relationship may be embodied as an equation and as a lookup table. The air/fuel ratio (AF) may be the actual air/fuel ratio, as reported by the fuel control module 240.

When the spark advance is set to the calibrated spark advance, the resulting torque may be as close to mean best torque (MBT) as possible. MBT refers to the maximum engine output torque that is generated for a given air flow as spark advance is increased, while using fuel having an octane rating greater than a predetermined threshold and using stoichiometric fueling. The spark advance at which this maximum torque occurs is referred to as MBT spark. The calibrated spark advance may differ slightly from MBT spark because of, for example, fuel quality (such as when lower octane fuel is used) and environmental factors. The torque at the calibrated spark advance may therefore be less than MBT.

Figure 3:
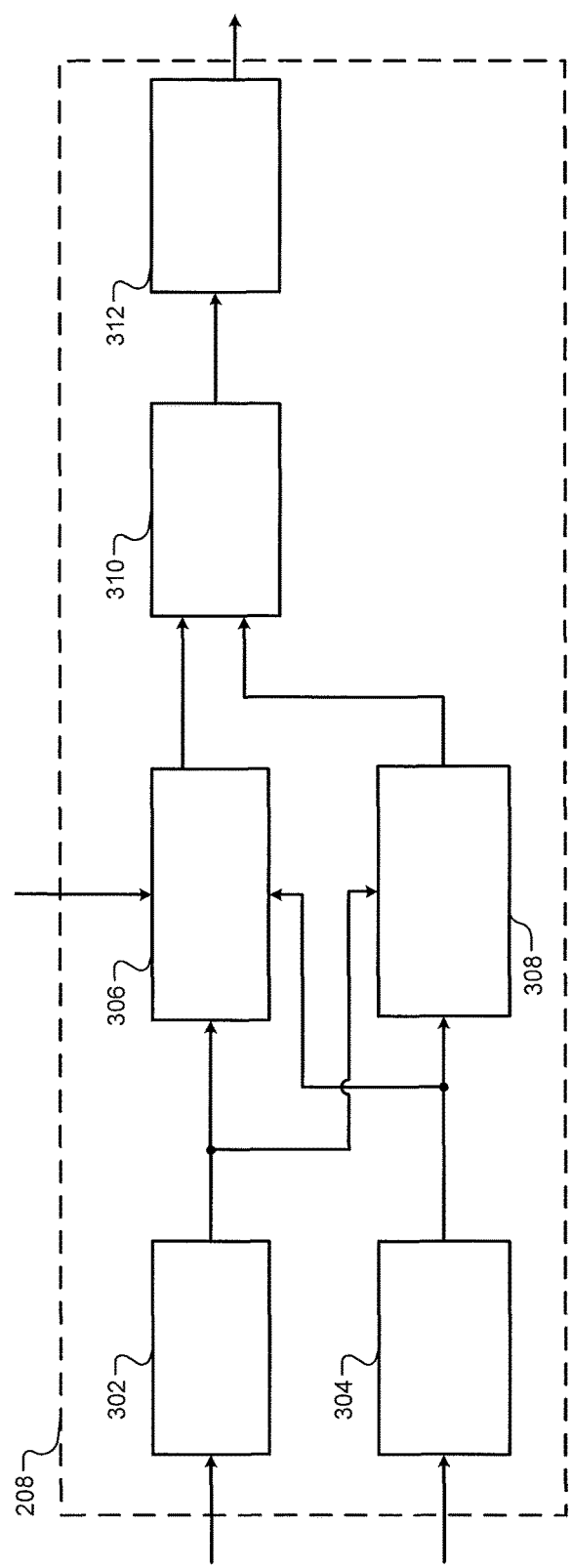
FIG. 3 is a functional block diagram of an example hybrid optimization control module according to the principles of the present disclosure

Referring to FIG. 3, a functional block diagram of an exemplary vehicle energy management system is presented. An exemplary implementation of the powertrain control module 208 includes a slope estimate module 302. The slope estimate module 302 receives elevation signals that can be utilized to determine a slope (i.e., grade) of the road that a vehicle is traversing. The slope estimate module 302 can receive road elevation signals in a variety of ways as described herein.

Figure 4A:
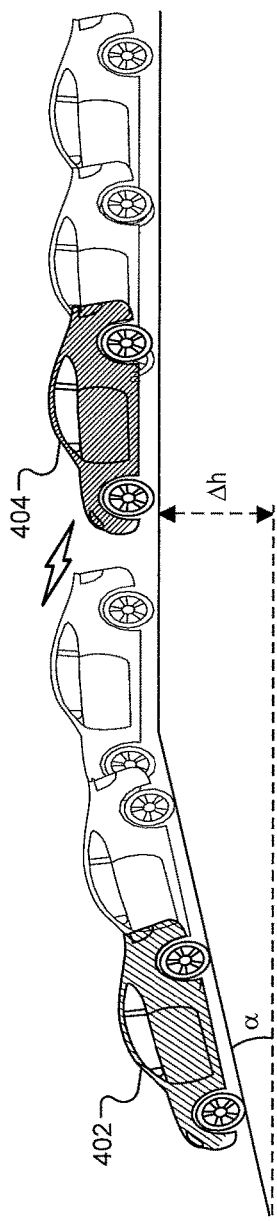
FIGS. 4A and 4B are diagrammatic illustrations of an example target vehicle and an example host vehicle traversing a roadway segment, where the host vehicle is receiving elevation data pertaining to the target vehicle.
Figure 4B:
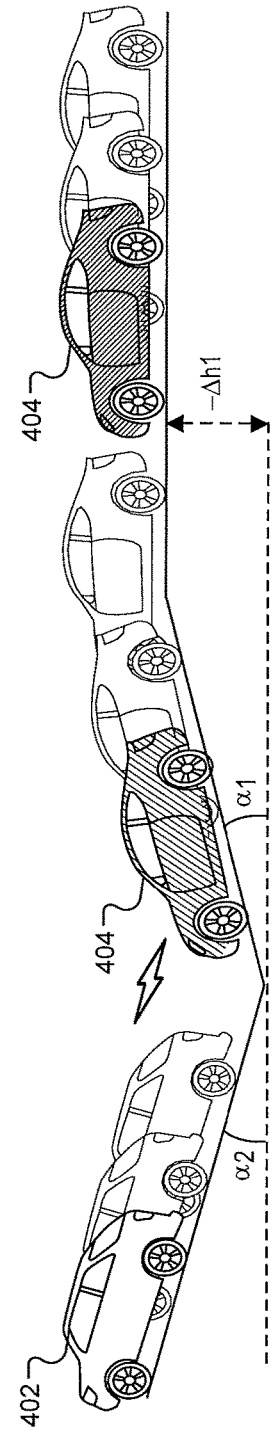

As shown in FIGS. 4A and 4B, in one example, the slope estimation module 302 receives signals from a target vehicle 402 that is traversing the roadway segment ahead of a host vehicle 404. For instance, as the target vehicle 402 traverses the roadway segment, the target vehicle 402 may continually emit signals having a relative elevation of the target vehicle 402 encoded within the signal. In this example, the target vehicle 402 and the host vehicle 404 can communicate with one another through vehicle-to-vehicle communication systems. In an implementation, the target vehicle 402 and the host vehicle 404 may communication with one another via a dedicated short-range communications (DSRC) protocol.

In another example, the host vehicle 404 may obtain signals utilizing object detection sensors (i.e., sensors 193). For instance, the host vehicle 404 can emit sensor signals and measure the time for the sensor signal to be detected by the object detection sensor to estimate a relative position of an object proximate to the host vehicle 404. The object detection signals can also include an elevation portion respecting a respective elevation value of the detected object with respect to the host vehicle 404. In one example, the object detection sensors may be radars, such as short-range radars, medium-range radars, and long-range radars, that continually detect objects about a host vehicle 404. In another example, the object detection sensors may be image capture devices that capture images and videos within a field-of-view of the respective image capture devices. In another example, the object detection sensors may be light detection and ranging (LIDAR) devices. In yet another example, the object detection sensors may be ultrasound devices. Referring to FIG. 5, the host vehicle 404 can receive positional and/or navigational signals encoded with elevation data and time data from global navigation satellite systems (GNSS) that are indicative of the elevation of the vehicle at the respective positions provided by the positional and/or navigational signals. The GNSS signals can be received at the one or more sensors 193.

The slope estimation module 302 determines an estimated slope of a roadway segment traversed by the vehicle, such as the host vehicle 404. The slope estimation module 302 can estimate the slope ($\alpha$) of a roadway segment located in an anticipated path of a vehicle utilizing data obtained from the elevation values encoded within the signals based on $$\alpha = \sin^{-1}\left(\frac{\Delta h - n}{\Delta d - n}\right) \quad (3)$$

The parameter h–n represents a vehicle's elevation at "n" time units before a current time; the parameter h represents a vehicle's elevation at the current time; the parameter $\Delta$h–n represents an elevation difference between the current time and "n" time units ago; and $\Delta$d–n represents a distance the vehicle has moved in "n" time units. This relationship may be embodied as an equation and as a lookup table. The elevation parameter "h" can be determined from the elevation data encoded in the signals, the time parameter "n" can be determined from the time data encoded in the signals, and the distance parameter "d" can be determined from distance values measured by the sensors 193 within the "n" time units.

The slope estimation module 302 receives the elevation values encoded within the signals and can store the elevation values obtained as a data set. The slope estimation module 302 determines whether the data set exceeds a predefined threshold for determining the slope of the roadway segment. The slope estimation module 302 can also determine whether the elevation values are an increasing set to indicate an uphill portion of the roadway segment or a decreasing set to indicate a downhill portion of the roadway segment.

The slope estimation module 302 can also determine an estimated distance associated with the roadway segment having the estimated slope portion. In one example, the slope estimation module 302 can monitor the relative elevation values of a target vehicle 402 until the relative elevation values transition from an increasing set to a decreasing set, or vice versa. In these examples, the signals are encoded with a speed value indicating a relative speed of the target vehicle 402. Thus, the slope estimation module 302 derives the distance based upon the time data encoded within the signals, the speed data encoded within the signals, and the elevation values encoded within the signals. In some implementations, the slope estimation module 302 can utilize the estimated slope (i.e., grade) to identify and classify target vehicles for the purposes of crash mitigation. For example, the slope estimation module 302 can utilize the slope of the roadway segment to classify target vehicles and determine intersection paths between the host vehicle 404 and the target vehicle(s) 402.

A state of charge (SOC) determination module 304 determines a state of charge (SOC) of the battery 199 of the vehicle (i.e., the host vehicle 404). The SOC determination module 304 may determine the SOC of the battery 199 based on a voltage of the battery 199. For example, the SOC determination module 304 may determine the SOC using one of a lookup table and an equation that relates voltages of the battery 199 to SOCs of the battery 199.

The SOC determination module 304 may determine the SOC additionally or alternatively based on the current to and from the battery 199. For example, the SOC determination module 304 may determine a mathematical integral of the current over each predetermined period and add the integration results to determine the SOC. As another example, the SOC determination module 304 may scale or offset the voltage based on the current, the scalar of offset determined based on the current, and determine the SOC using one of a lookup table and an equation that relates these salved or offset voltages to SOCs of the battery 199. The SOC determination module 304 may determine the SOC further based on a temperature of the battery 199. SOCs are generally provided as a percentage between 0% indicative of 0 charge (i.e., completely discharged) and 100% indicative of the battery 199 being completely charged.

A power determination module 306 receives the estimated slope signals from the slope estimation module 302 and the SOC charge signals from the SOC determination module 304. The power determination module 306 can utilize one or more of these inputs to generate an estimated power consumption signal that represents an estimated additional power to be utilized by the vehicle when traversing the roadway segment to maintain a desired vehicle speed due to the estimated slope of the roadway segment.

In one example, the power determination module 306 receives one or more vehicle parameters pertaining to an operational status of the vehicle traversing a roadway segment. For instance, the predicted torque signals and the immediate torque signals may be utilized by the power determination module 306 to determine the estimated power consumption to cause the vehicle to traverse the roadway at the desired vehicle speed. The power determination module 306 can calculate the estimated power to be consumed by the vehicle to maintain the vehicle at the desired vehicle speed while traversing the roadway segment. Additionally, the power determination module 306 can calculate the estimated power to be consumed by the vehicle due to a modified driver input at the driver input module 104 while traversing the roadway segment.

The estimated slope can represent estimated grade characteristics pertaining to the roadway segment being traversed and can represent distance characteristics pertaining to the grade characteristics. In one example, the estimated terrain signal can indicate that the roadway has a three degree (3°) incline for a half of a mile (½ mile). In another example, the estimated terrain signal can indicate that the roadway has a three degree (1°) decline for a one mile (1 mile).

In one example, the power determination module 306 estimates the amount of power based upon an estimated additional torque to be utilized by the engine 102 to maintain the desired speed over the roadway segment utilizing the estimated slope signal and the desired speed. The estimated additional torque is a function of current speed of the vehicle and a current grade of the road being traversed. The power determination module 306 can utilize vehicle operational parameters based upon the vehicle operational parameters measured by the sensors 193. In one example, the power determination module 306 derives the current grade from the vehicle speed and longitudinal acceleration as measured by the sensors 193.

The accelerometer signals can be integrated and compared to the vehicle speed and the difference between the values is proportional to the current grade. For a flat grade, the integral of the accelerometer signals representing accelerometer data in the longitudinal axis may be equal to the vehicle velocity. For increasing grades, a portion of acceleration due to gravity is opposing the forward acceleration of the vehicle. Thus, the integral of accelerometer data along the longitudinal axis results in a velocity of the vehicle that is lower than the vehicle speed estimate provided by the sensors. The power determination module 306 determines that the difference in velocity and the vehicle speed is proportional to the current grade. For deceasing grades, the integral of the measured sensor data in a higher vehicle speed estimate than the true vehicle speed since gravity is acting on the vehicle in the same direction as the vehicle motion.

The power determination module 306 can define the difference between the estimated vehicle speed and the actual vehicle speed as being proportional to the current grade. In some instances, the current. Utilizing the current vehicle speed and the determined current road grade, the power determination module 306 calculates the additional power to be utilized based upon the estimated additional torque to traverse the roadway segment at the desired speed. Additionally, the power determination module 306 can estimate a desired power reserve to be maintained within the battery 199 based upon the detected slope characteristics of the roadway segment.

A SOC target module 308 sets a SOC target that depends upon the grade and the length of the roadway segment. The SOC target can be utilized to allow for depletion of the battery 199 to provide performance and fuel economy while preserving enough battery 199 power to allow the vehicle to complete the roadway segment without degradation in performance of the vehicle. In one example, the SOC target module 308 employs a look-up table that maintains multiple SOC targets that correspond with respective grade parameters (i.e., characteristics), distance along the roadway segment, and current SOC values. The SOC target can provide for stabilizing selections between multiple operational states (i.e., range states). Stabilizing selection between the operational states reduces shifting within the engine 102 that may increase drivability and fuel economy.

For instance, a roadway segment having a grade parameter of two degrees (2°) for two and a half miles (2½ miles) and a current SOC value of seventy-five percent (75%) may correspond to a target SOC value of sixty-five percent (65%). Thus, the vehicle can operate in a first range state (i.e., charge depleting mode) that allows for the electric motor 198 to be charged by the battery 199 resulting in the battery 199 depleting from seventy-five percent (75%) to sixty-five percent (65%).

A state selection module 310 determines a stabilization parameter based upon the power consumption signal provided by the power determination module 304 and the SOC target signal provided by the SOC target module 308. The state selection module 310 utilizes the stabilization parameter to stabilize selection between various operational states. For instance, the state selection module 310 can utilize the stabilization parameter to bias the powertrain control module 208 to a capable operational state based upon the estimated slope of the roadway segment. Additionally, the stabilization parameter can be utilized to prevent a shift to an operational state that is not capable of producing additional power based upon the desired vehicle speed, the roadway characteristics, and the like. For instance, the powertrain control module 208 latches to a current (i.e., first) operational state unless a more capable torque producing operational state can be achieved reduces shifting that would otherwise result every time a potential shift from a current operational state to an available operational state is detected.

The engine system 100 can operate in one of a multiple operational states. The operational states can include multiple transmission ranges and engine states to generate and transfer torque to a driveline of the vehicle. The engine states include an on state, an off state, and a fuel cutoff state. When the engine operates in the off state, the engine is unfueled, not firing, and is not spinning. When the engine system 100 operates in the on state, the engine system 100 is fueled, firing, and spinning. When the engine system 100 operates in the fuel cutoff state, the engine 102 is spinning but is unfueled and not firing.

The transmission ranges include a plurality of neutral, fixed gear, variable mode, electric vehicle, and transitional ranges that are achieved by selectively activating the clutches within the engine system 100. A pseudo-gear range is a variable mode transmission range in which torque output from the transmission corresponds to the input torque from the engine 102, taking into account torque losses associated with torque-consuming components on an input member of the engine 102. The pseudo-gear ranges are primarily employed as intermediate transmission ranges during shifts between variable (EVT) mode ranges. Thus, an operational state of an engine system 100 may be any combination of engaged/disengaged components, operational/non-operational torque sources, and torque generating/torque consuming modes.

The state selection module 310 can select an operational state based upon the approaching grade of the roadway segment to be traversed, the amount of power to be consumed by the engine 198 allowing for the engine system 100 to generated a sufficient amount of torque to remain in a desired speed while traversing the roadway segment, and the SOC target. In one example, the state selection module 310 determines whether the current operational state can produce the additional amount of power to traverse the roadway segment.

When the current operational state cannot produce the additional amount of power, the state selection module 310 determines a capable operational state that can generate the additional power to produce the additional drive torque. In one example, the state selection module 310 employs an operational state look-up table defining each operational state of the engine system 100. The state selection module 310 may iteratively parse the operational states to determine which operational state can generate the additional power for producing the additional drive torque.

For instance, the state selection module 310 can select an operational state from the available operational states that can provide the additional power while conserving the SOC of the battery 199 based upon the SOC target. In one example, the state selection module 310 determines that at least a first operational state and a second operational state are available for producing the additional power to generate the additional drive torque. In this example, the state selection module 310 determines (i.e., compares) which of the first operational state or the second operational state would conserve the SOC (i.e., maximize the amount of charge within) the battery 199 and generates an operational state signal indicative of the selected operational state.

When the current operational state can produce the additional amount of power, the state selection module 310 determines whether the current operational state is an optimal (i.e., most capable) operational state (i.e., operational state that conserves the SOC of the battery 199) of the available operational states. In one example, the state selection module 310 compares whether an estimated SOC target for the current operational state exceeds an estimated SOC target for another operational state. The estimated SOC target of the battery 199 can correspond to the expected SOC of the battery upon the vehicle traversing the roadway segment while the engine system 100 is operating in the respective operational state. The state selection module 310 can utilize the operational state look-up table described above to determine whether the estimated SOC of the battery 199 for the current operational state exceeds the SOC target.

If the state selection module 310 determines that another operational state is more capable than the current operational state, the state selection module 310 determines whether the current operational state can generate the amount of power to be utilized to generate the additional torque allowing the vehicle to traverse the roadway segment at the desired speed. In some instances, the state selection module 310 maintains the vehicle in the current operational state when the current operational state can generate the amount of power to be utilized to generate the additional torque allowing the vehicle to traverse the roadway segment at the desired speed.

Thus, the stabilization parameter biases the state selection module 310 to the optimal operational state. However, the state selection module 310 may not cause a shift to another operational state when the current operational state is capable of generating the estimated amount of power (i.e., the power consumption). Additionally, the stabilization parameter prevents the state selection module 310 from initiating a shift from the most capable state to a less capable state. Based upon the determination, the state selection module generates a state selection signal indicative of the selected operational state.

A state control module 312 receives the state selection signal and generates an operational state control signal based upon the state selection signal. In one example, the state control module 312 communicates the operational state control signal to the transmission control module 194 to coordinate shifting gears within the transmission. The state control module 312 also communicates with the hybrid control module 196 to coordinate operation of the engine 102 with the electric motor 198. For instance, the state control module 312 generates a signal, based upon the state selection signal, to cause the engine 102 to transition from a first operational state to a second operational state to provide additional power to the engine 102 such that the vehicle can maintain a desired speed along a roadway segment based upon the estimated slope signal. In one example, the operational states may transition from a charge-depleting operational state to a charge-sustaining operational state.

Figure 6:
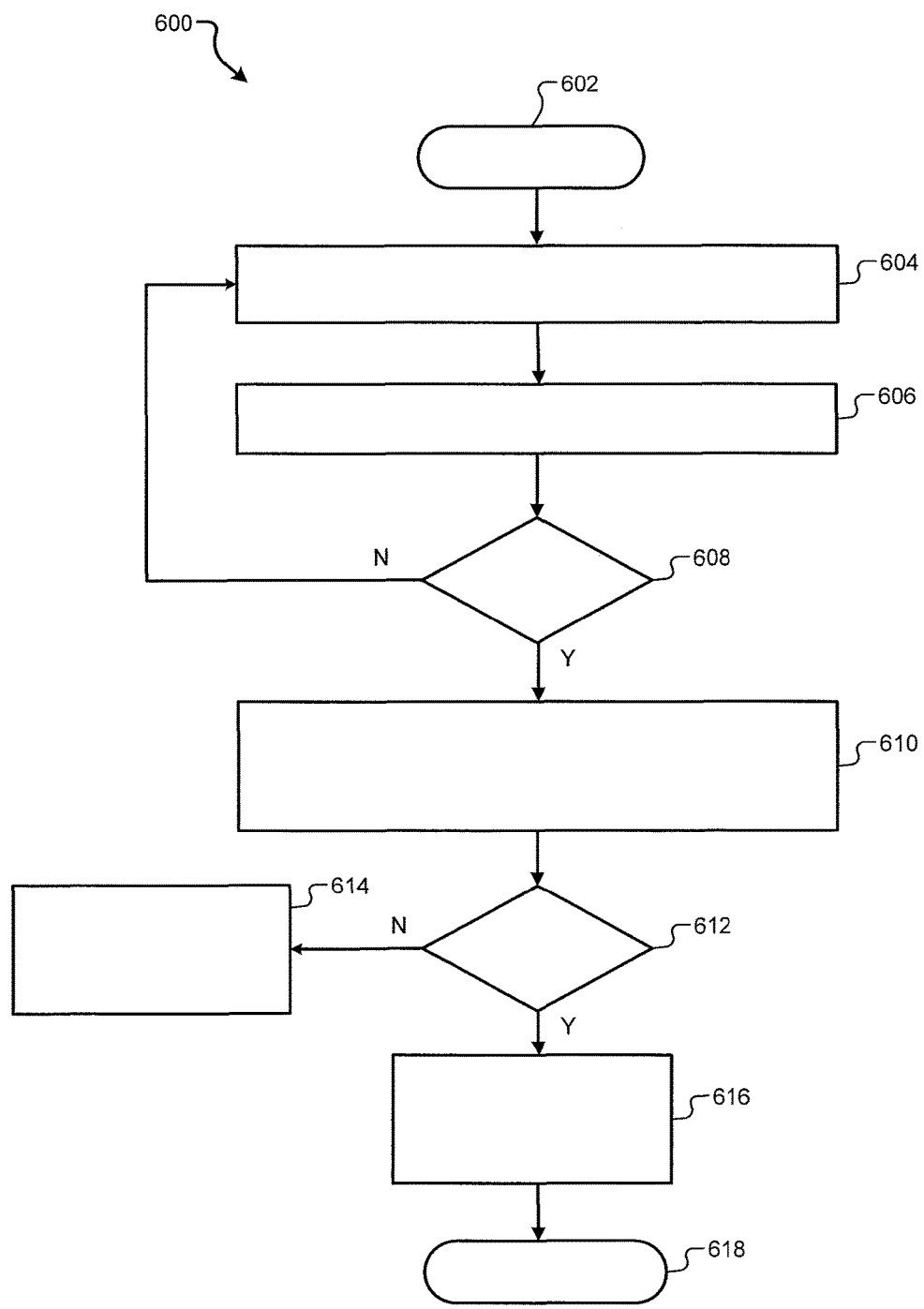
FIG. 6 is a flowchart illustrating an example method for estimating a slope of a roadway segment based upon elevation data pertaining to a target vehicle according to the principles of the present disclosure.

FIG. 6 illustrates an example method 600 for determining an estimated elevation of a roadway segment based upon estimated slope signals. The method 600 starts at 602. At 604, the slope estimation module 302 receives elevation data and time data corresponding to the elevation data from a vehicle to vehicle (V2V) communication system or a radar system. In one example, the slope estimation module 302 receives elevation data and time data obtained from communication signals transmitted and received through a vehicle-to-vehicle communication protocol. For instance, in this example, the host vehicle 404 receives one or more communication signals representing a safety message that includes the elevation data. In another example, the slope estimation module 302 receives elevation data and time data extracted from sensor data received at an object detection sensor (i.e., one or more sensors 193). In this example, the host vehicle 404 receives sensor data representative of a detected object (i.e., a target vehicle 402) that includes the elevation data.

At 606, the slope estimation module 302 stores the received elevation data and time data. In one example, the received elevation data and time data may be stored within one or more data structures accessible by the slope estimation module 302. At 608, the slope estimation module 302 determines whether a data set representing the received elevation data and time data exceeds a predefined threshold. If the data set representing the received elevation data and time data does not exceed the predefined threshold, the method 600 transitions to 604 to continue receiving elevation data. If the data set representing the received elevation data and time data does exceed the predefined threshold, the slope estimation module 302 calculates a slope of the roadway segment utilizing the data set at 610. In one example, the slope estimation module 302 utilizes equation (3) described above to determine the slope based upon the elevation data.

At 612, the slope estimation module 302 determines whether the elevation is increasing. If the elevation decreasing, the slope estimation module 302 determines that the slope is a downhill slope at 614. If the elevation data set is ascending, the slope estimation module 302 determines that the slope is an uphill slope at 616. The method 600 can end at 618.

Figure 7:
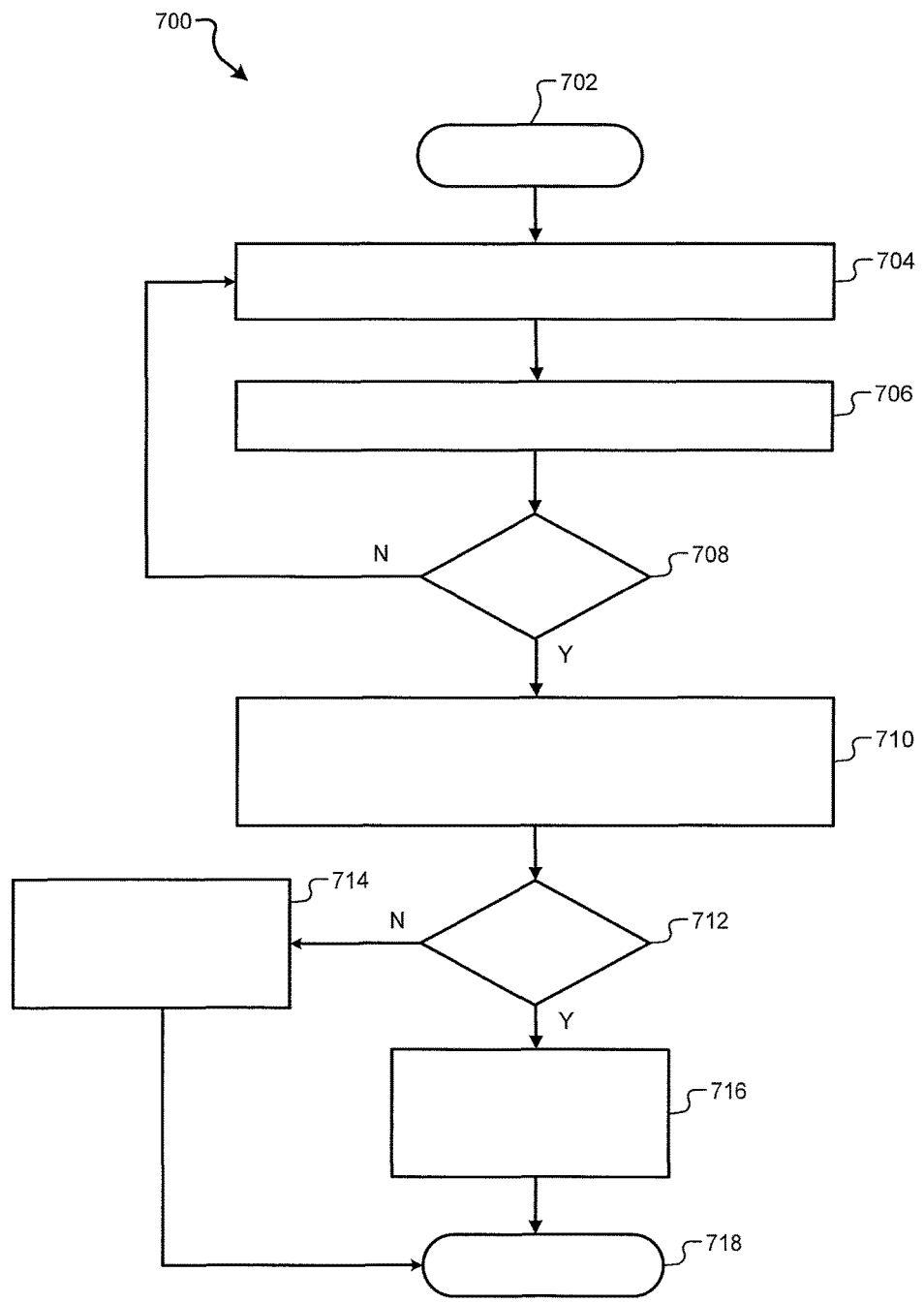
FIG. 7 is a flowchart illustrating an example method for estimating a slope of a roadway segment based upon elevation data pertaining to a host vehicle according to the principles of the present disclosure.

FIG. 7 illustrates an example method 700 for determining an estimated elevation of a roadway segment based upon estimated slope signals. The method 700 starts at 702. At 704, the slope estimation module 302 receives elevation data and time data corresponding to the elevation data from a GNSS communication system.

At 706, the slope estimation module 302 stores the received elevation data and time data. In one example, the received elevation data and time data may be stored within one or more data structures accessible by the slope estimation module 302. At 708, the slope estimation module 302 determines whether a data set representing the received elevation data and time data exceeds a predefined threshold. If the data set representing the received elevation data and time data does not exceed the predefined threshold, the method 700 transitions to 704 to continue receiving elevation data. If the data set representing the received elevation data and time data does exceed the predefined threshold, the slope estimation module 302 calculates a slope of the roadway segment utilizing the data set at 710. In one example, the slope estimation module 302 utilizes equation (3) described above to determine the slope based upon the elevation data.

At 712, the slope estimation module 302 determines whether the elevation data set is ascending (i.e., is an increasing set). If the elevation data set is not ascending (i.e., a decreasing set), the slope estimation module 302 determines that the slope is a downhill slope at 714. If the elevation data set is ascending, the slope estimation module 302 determines that the slope is an uphill slope at 716. The method 700 ends at 718.

Figure 8:
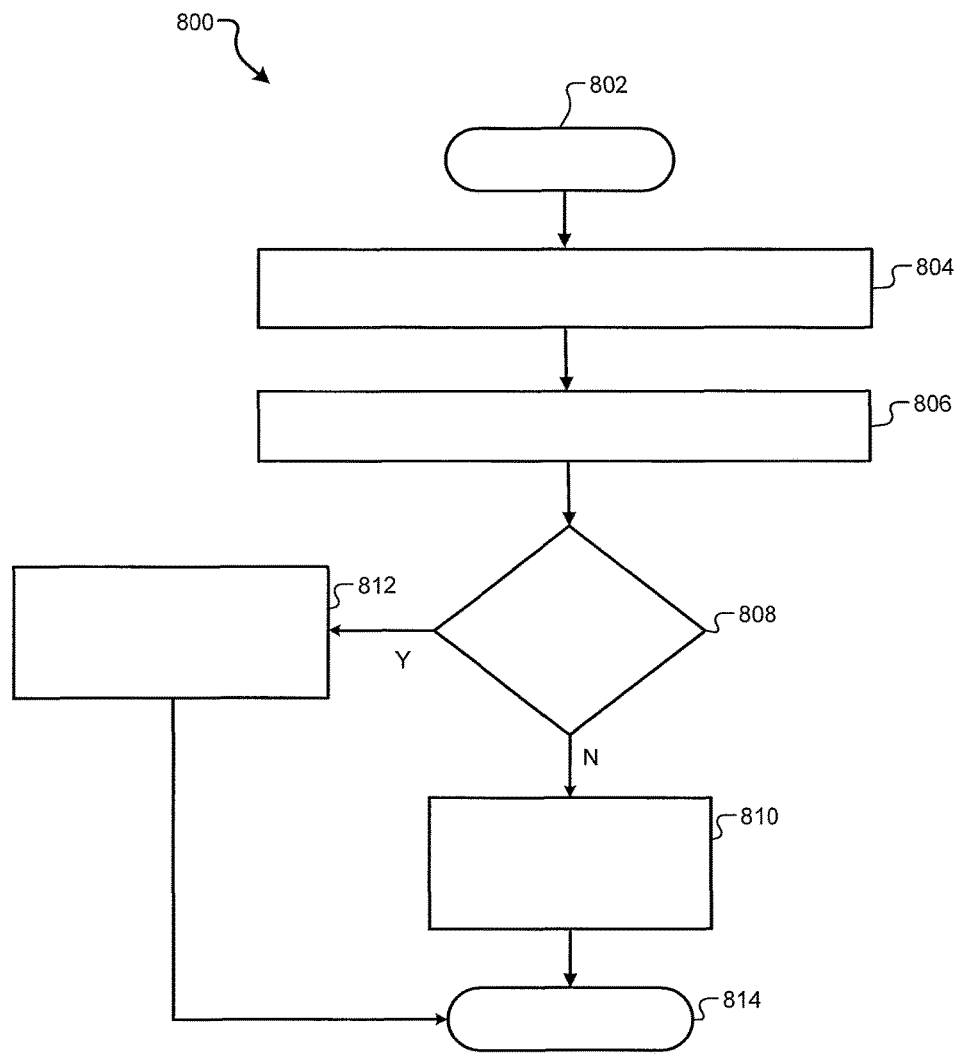
FIG. 8 is flowchart illustrating an example method for determining whether a target vehicle and a host vehicle are within a same geometrical plane defined with respect to a slope of a roadway segment according to the principles of the present disclosure.

FIG. 8 illustrates an example method 800 for determining whether the target vehicle 402 is within the same plane as the host vehicle 404. Method 800 begins at step 802. At 804, the slope estimation module 302 receives the elevation data and determines the estimated slope (i.e., determined slope angle) for the target vehicle 402. At 806, the slope estimation module 302 receives the elevation data and the slope (i.e., determined slope angle) for the host vehicle 404.

At 808, the slope estimation module 302 compares the plane of the target vehicle 402 with the plane of the host vehicle 404. In one example, the slope estimation module 302 compares the elevation data of the target vehicle 402 with elevation data of the host vehicle 404 based upon corresponding time data. For instance, the slope estimation module 302 compares the elevation data at time "n" of the target vehicle 402 with elevation data of the host vehicle 404 at corresponding time "n" to determine whether the elevation data of the target vehicle 402 is equal (i.e., matches) to elevation data of the host vehicle 404.

If the elevation data does not match, the slope estimation module 302 determines that the target vehicle 402 is not in the same plane as the host vehicle 404 at 810. If the elevation data does match, the slope estimation module 302 determines that the target vehicle 402 is in the same plane as the host vehicle 404 at 812. The determination of whether the host vehicle 404 and the target vehicle 402 are in the same plane can be utilized to determine whether a roadway segment's slope differs from the slope of the roadway segment the host vehicle 404 is currently traversing. The method ends at 814.

Figure 9:
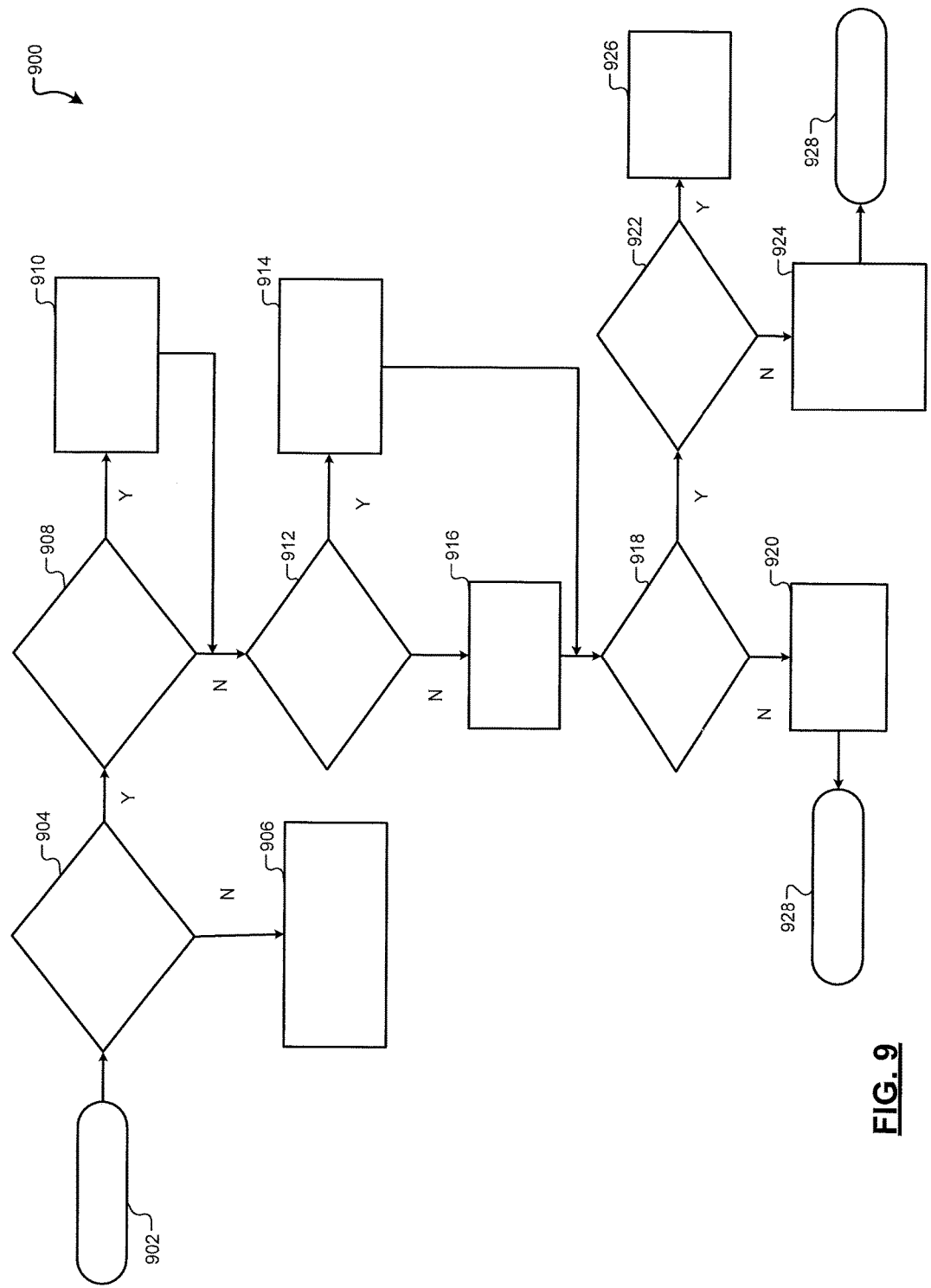
FIG. 9 is flowchart illustrating an example method for determining whether a current operational state of a vehicle can generate power based upon a slope of a roadway segment being traversed by the vehicle at a desired speed according to the principles of the present disclosure.

FIG. 9 illustrates an example method 900 for determining whether to transition from a first operational state to a second operational state based upon a determined slope of a roadway segment. The method 900 begins at 902. At 904, the slope estimation module 302 determines whether a positive grade is approaching or whether the host vehicle 404 is currently traversing a positive grade. If a positive grade is not approaching and the host vehicle 404 is not currently traversing a roadway segment having a positive grade, a stabilization parameter of the powertrain control module 208 is not modified at 906.

If a positive grade is approaching or the host vehicle 404 is currently traversing a roadway segment having a positive grade, the SOC determination module 304 determines whether the SOC of the battery 199 is below a defined SOC threshold at 908. The SOC threshold of the battery 199 is based upon the length of the roadway segment having the positive slope and the magnitude of the slope. Thus, the SOC determination module 304 determines how much SOC should be preserved according to the length of the roadway segment and the magnitude of the slope. If the SOC of the battery 199 is below a defined SOC threshold, the stabilization parameter is biased to a charge sustaining operational state at 910.

At 912, the slope estimation module 302 determines whether a positive grade is approaching or whether an increase in the slope (i.e., grade) is approaching. If a positive grade is approaching or an increase in the grade is approaching, the power determination module 306 estimates the additional power to be utilized by the host vehicle 404 to traverse the roadway segment at 914. If a positive grade is not approaching and an increase in the grade is not approaching (i.e., the host vehicle 404 may already be traversing the roadway segment having the increased or positive slope), the power determination module 306 estimates a power reserve (i.e., SOC) to be maintained within the batter based upon the determined roadway segment slope characteristics at 916.

At 918, the state selection module 310 determines whether a current operational state can produce the additional power to allow the host vehicle 404 to traverse the roadway segment having the slope characteristics. If the current operational state cannot produce the additional power, the state selection module 310 determines the most capable operational state that can produce the additional power to produce the additional torque and causes the state control module 312 to initiate the transition from the current operational state to the most capable operational state at 920.

If the current operational state can produce the additional power, the state selection module 310 determines whether the current operational state is the most capable operational state at 922. If the current operational state is not the most capable operational state, the stabilization parameter is biased to operational states that can produce the additional amount of power at 924. Thus, the state selection module 310 utilizes the stabilization parameter to determine which operational states can be shifted to in order to produce the additional power. For instance, the state selection module 310 can continually monitor the stabilization parameter when determining operational states based upon the slope characteristics. If the current operational state is the most capable operational state, the stabilization parameter is biased to maintain the current operational state at 926. The method ends at 928

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and microcode, and may refer to programs, routines, functions, classes, data structures, and objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
    a power determination module configured to estimate power required to travel at a desired speed on a roadway segment located in an anticipated path of a vehicle based upon an estimated slope of the roadway segment, wherein the estimated power corresponds to an estimated additional torque to maintain the vehicle at the desired speed along the roadway segment;
    a powertrain control module that is configured to control a plurality of operational states of a hybrid powertrain and that includes a state selection module configured to:
        determine whether a current one of the plurality of operational states is capable of producing the estimated power based upon a state of charge of a vehicle battery; and
        when the current operational state is incapable of producing the estimated power, switch to another one of the plurality of operational states that is capable of producing the estimated power.

2. The system as recited in claim 1 further comprising a slope estimation module configured to estimate the slope of the roadway segment being traversed by the vehicle based upon elevation signals indicative of an elevation associated with the roadway segment.

3. The system as recited in claim 2 wherein the slope estimation module is configured to receive elevation signals from a target vehicle traversing the roadway segment, wherein the elevation signals are transmitted through a vehicle-to-vehicle communication protocol.

4. The system as recited in claim 3 wherein the vehicle-to-vehicle communication protocol comprises at least one of dedicated short-range communications protocol and an advanced driver assistance systems communication protocol.

5. The system as recited in claim 2 wherein the slope estimation module is configured to receive elevation signals from an object detection sensor disposed within the vehicle, the object detection sensor configured to receive object detection signals indicative of a detected object proximate to the vehicle, wherein the object detection signals are encoded with elevation data indicative of an elevation of the detected object relative to the vehicle.

6. The system as recited in claim 5 wherein the object detection sensor comprises at least one of a radar device, a light detection and ranging device, and an ultrasound device.

7. The system as recited in claim 2 wherein the slope estimation module is configured to receive elevation signals from positional signals indicative of a position of the vehicle transmitted from a global navigation satellite system, wherein positional signals are encoded with elevation data indicative of an elevation of the vehicle at the position.

8. The system as recited in claim 1 further comprising a state of charge determination module configured to determine a state of charge of the vehicle battery of the vehicle.

9. The system as recited in claim 1 further comprising a state of charge target module configured to determine a state of charge target of the vehicle battery of the vehicle based upon the estimated slope of the roadway segment.

10. The system as recited in claim 9 wherein the state selection module is configured to determines a stabilization parameter based upon the estimated power and the state of charge target, wherein the state selection module utilizes stabilization parameter to prevent transitioning from the current operational state to another one of the plurality of operational states when the current operational state can produce the estimated power.

11. A method comprising:
    estimating, at a power determination module, power required to travel at a desired speed on a roadway segment located in an anticipated path of a vehicle based upon an estimated slope of the roadway segment, wherein the estimated power corresponds to an estimated additional torque to maintain the vehicle at the desired speed along the roadway segment;
    determining, at a powertrain control module, whether a current one of a plurality of operational states is capable of producing the estimated power based upon a state of charge of a vehicle battery; and
    where the current operational state is incapable of producing the estimated power, switching to another one of the plurality of operational states that is capable of producing the estimated power.

12. The method as recited in claim 11 further comprising estimating the slope of the roadway segment being traversed by the vehicle based upon elevation signals indicative of an elevation associated with the roadway segment.

13. The method as recited in claim 12 further comprising receiving elevation signals from a target vehicle traversing the roadway segment, wherein the elevation signals are transmitted through a vehicle-to-vehicle communication protocol.

14. The method as recited in claim 13 wherein the vehicle-to-vehicle communication protocol comprises at least one of dedicated short-range communications protocol and an advanced driver assistance systems communication protocol.

15. The method as recited in claim 12 further comprising receiving elevation signals from an object detection sensor disposed within the vehicle, the object detection sensor configured to receive object detection signals indicative of a detected object proximate to the vehicle, wherein the object detection signals are encoded with elevation data indicative of an elevation of the detected object relative to the vehicle.

16. The method as recited in claim 15 wherein the object detection sensor comprises at least one of a radar device, a light detection and ranging device, and an ultrasound device.

17. The method as recited in claim 12 further comprising receiving elevation signals from positional signals indicative of a position of the vehicle transmitted from a global navigation satellite system, wherein positional signals are encoded with elevation data indicative of an elevation of the vehicle at the position.

18. The method as recited in claim 11 further comprising determining a state of charge of a battery of the vehicle.

19. The method as recited in claim 11 further comprising determining a state of charge target of a battery of the vehicle based upon the estimated slope of the roadway segment.

20. The method as recited in claim 19 further comprising determining a stabilization parameter based upon the estimated power and the state of charge target, wherein the stabilization parameter prevents transitioning from the current operational state to another operational state of the plurality of operational states when the current operational state can produce the estimated power.

* * * * *